(No Model.)

W. R. WARDEN.
CHEESE CUTTER.

No. 318,333. Patented May 19, 1885.

WITNESSES:
Chas. S. Gooding.
W. R. Marble

INVENTOR:
William R. Warden
By Sylvenus Walker
Atty

UNITED STATES PATENT OFFICE.

WILLIAM R. WARDEN, OF SOMERVILLE, ASSIGNOR TO DANIEL H. BISHOP, OF BOSTON, MASSACHUSETTS.

CHEESE-CUTTER.

SPECIFICATION forming part of Letters Patent No. 318,333, dated May 19, 1885.

Application filed January 26, 1885. (No model.)

*To all whom it may concern:*

Be it known that I, WILLIAM R. WARDEN, of Somerville, in the county of Middlesex and State of Massachusetts, have invented certain new and useful Improvements in Cheese-Cutters, of which the following is a specification.

The object of my invention is to provide a new, cheap, simple, durable, and convenient cutter, whereby the cloth surrounding the peripheries or edges of cheese may be cut circumferentially into two or more strips or divisions, and then a piece of fine wire provided with a handle at each end, as used in cutting tubs of butter, be inserted in the external cut formed by the said cutter and drawn through the cheese from side to side, severing the same into two or more disks or divisions horizontally, when the top disk may be cut vertically by means of a common knife, as heretofore, and without liability of waste, as now practiced; and it consists of the cutting device, as hereinafter more fully described, and set forth in the claim.

Figure 1:
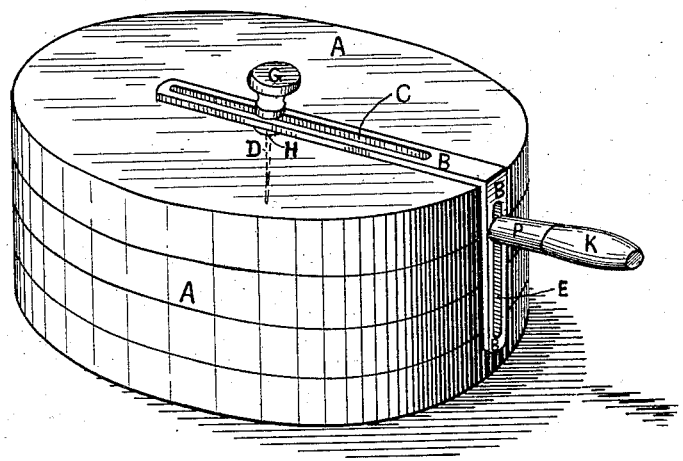
Figure 2:
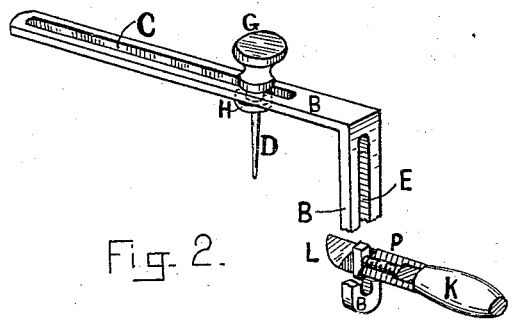
Figure 3:
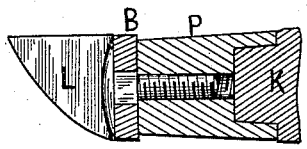

Figure 1 represents a perspective view of a cutter embodying my invention as applied to a cheese in the act of cutting the same. Fig. 2 represents a similar view of the same as removed from the cheese. Fig. 3 is an enlarged sectional elevation of the cutter removed.

B represents a flat metal bar provided with a longitudinal slot, C, extending nearly the whole length of the same, the said slot C being provided with a tapering point, D, the upward end of which is provided with a short knob or handle, G, and is secured or retained within the said slot C by means of a washer, H, applied to the pivotal piercing-point D or body portion thereof just below the said bar B, so as to permit the said bar to turn upon and freely slide on the body portion of the piercing device D when the same is forced into a cheese, A, near its center, as shown in Fig. 1. The said bar B is bent at a right angle at a point about one-third of its extreme length, more or less, as desired, and this shorter arm portion of said bar B is provided with a longitudinal slot, E, extending nearly the whole length of the same, as shown. Within this slot E is fitted the square shank portion of the short cutter L, so as to be slid up or down therein, as desired, the said shank portion being provided with an extension formed round and provided with a screw-thread which fits within a corresponding screw-threaded nut or end of the ferrule P, secured upon the end of the operating-handle K, whereby the end of the handle may be brought to bear against the outward face of the shorter arm or vertical portion of the said bar B by turning the said handle in the right direction, so as to screw the same upon the screw-threaded shank portion of the knife or cutter L to cause the bearings of the parts brought in contact with the opposite sides of the said slotted bar to grip the same, so as to temporarily secure the said cutter L at the desired point on the said vertical bar B to allow a person to force the pointed cutter through the cloth covering the outward edges of a cheese, A, as shown in Fig. 1, and then be turned or forced around the circumference of the same, so as to cut or sever the cloth and form a cut or shallow crease within the outward surface of the cheese, wherein a common hand-wire may be inserted and drawn through the cheese in the same manner as now employed in cutting through a tub of butter after removal from the tub, the long slot in the horizontal portion of the bar B permitting the pivotal piercing-instrument to be forced into the top of the cheese at random, and allow the cutter and right-angle bar to pass around the cheese in cutting the same, the said slot permitting the horizontal bar to slide on the pivot D to compensate for such irregularity or variation of insertion from the center of the cheese when the piercing-point D has been thus inserted. Said slot also permits the said cutting device to be equally adapted to cut cheese of any or various diameters without adjusting the said pivotal piercing-instrument D. The said knife or cutter L may be adjusted and secured at such points upon the vertical portion of the operating-bar B as to cut the covering of cloth at such points desired between the top and bottom of the cheese that when the sections are thus formed a piece cut vertically from one of such by a common knife may be removed readily from the cheese of the size desired without liability of crumbling or breaking the piece removed, or the remaining portion, as is frequently the case wherein a common cheese-knife is forced horizontally into the circumference of the cheese to sever the bottom of the piece cut.

Having thus described my invention, what I claim is—

A cheese-cutter consisting of the bent metal bar B, the horizontal portion of which is provided with a longitudinal slot, C, provided with a piercing device, D, and the vertical right-angle portion having a longitudinal slot, E, provided with an adjustable knife or cutter, L, adapted to operate substantially as described.

WILLIAM R. WARDEN.

Witnesses:
SYLVENUS WALKER,
CHAS. S. GOODING.